United States Patent [19]

O'Brien et al.

[11] Patent Number: 4,819,183

[45] Date of Patent: Apr. 4, 1989

[54] AIRCRAFT FUEL LOADING MANAGEMENT SYSTEM

[75] Inventors: Edward M. O'Brien, Holland, Pa.; Donald R. Otto, Trenton, N.J.

[73] Assignee: Ametek, Inc., New York, N.Y.

[21] Appl. No.: 818,786

[22] Filed: Jan. 14, 1986

[51] Int. Cl.$^4$ .............................................. B67D 5/00
[52] U.S. Cl. .................................... 364/509; 364/564; 73/861.03
[58] Field of Search ............... 364/509, 510, 465, 567, 364/564; 73/861.01, 861.02, 861.03, 227

[56] References Cited

U.S. PATENT DOCUMENTS

| | | | |
|---|---|---|---|
| 3,945,253 | 3/1976 | Liu et al. | 73/861.02 |
| 3,958,447 | 5/1976 | Baker et al. | 73/861.02 |
| 4,300,401 | 11/1981 | Pedersen | 364/510 X |
| 4,313,168 | 1/1982 | Stephen et al. | 364/465 |
| 4,358,821 | 11/1982 | Niemi | 364/152 |
| 4,409,660 | 10/1983 | Shauger | 364/510 |
| 4,414,634 | 11/1983 | Louis et al. | 364/510 |
| 4,419,898 | 12/1983 | Zanker et al. | 364/510 X |
| 4,463,428 | 7/1984 | Gilliam | 364/463 |
| 4,593,365 | 6/1986 | Haley, Jr. et al. | 364/510 |

OTHER PUBLICATIONS

Advertisement of Cox Instrument, Ametek Corp, Schutte & Koerting Division, CC8604 Series 8550 Temperature Module Description titled "Module Features" (9 pages) related to CC8600, CC8601, CC8603 and CC8604 Advertisements.

Paper of British Airways on Technical Services, titled "Measurement of Fuel Weight Delivered to Aircraft" Sep. 10, 1984.

Paper of British Airways Operations Emergency, titled "Measurement of Fuel Weight Delivered to Aircraft" (6 pages) Aug. 31, 1983.

Advertisement of LectroCount, Publication No. LC293A, titled "Products Accountability System", Jul. 1983.

Advertisement of Cox Instrument, Ametek Corp., Schutte & Koerting Division, CC9402, Series 8500 Microprocessor-Based Flow Computer and 5 page description related thereto titled "8500 Series Flow Computer" pp. 3-7 related thereto.

Advertisement of Cox Instrument, Ametek Corp., Schutte & Koerting Division, CC8600, Series 8550 Microprocessor-Based Modular Flow Instrumentation and Description titled "8550" Microprocessor Based Panel Meter (8 pages) relating thereto.

Advertisement of Cox Instrument, Ametek Corp., Schutte & Koerting Division, CC8601 Series 8550, K-Factor Module.

Advertisement of Cox Instrument, Ametek Corp. Schutte & Koerting Division, CC8603, Series 8550 Selector Module.

Microprocessor Based Totalizing Fuel Flow Measurement System Proposal No. 949-011, Jul. 6, 1979, Cox Instrument/Division of Lynch Corporation, pp 1-7.

Microprocessor Based Totalized Mass Fuel Flow Measurement System 1982, Cox Instrument/Division of Lynch Corp. pp 1-7.

Advertisement of Cox Instrument, Division of Lynch Corp., Series 7500 Microprocessor Flow Computers and 3 pages description titled "Development In Microprocessor Based Flow Instrumentation" related thereto.

Primary Examiner—Parshotam S. Lall
Assistant Examiner—Thomas G. Black
Attorney, Agent, or Firm—Amster, Rothstein & Ebenstein

[57] ABSTRACT

A computer-controlled aircraft fuel loading management system is disclosed. The system measures fuel loading volumetrically using flow meter devices and gravimetrically using information relating to the density (specific gravity) of the fuel being loaded entered prior to a fuel loading operation, changes in the temperature of the fuel being loaded and stored information relating to the densities (specific gravities) of a number of fuels and changes thereto with temperature which are derived from American Petroleum Institute information. The system automatically computes and displays the distribution of fuel by tank from stored aircraft tank and fuel load distribution information derived from aircraft manufacturer information. The system also converts a total fuel volume as measured by the system to a standardized fuel volume normalized to a given temperature, for example 60° F.

14 Claims, 13 Drawing Sheets

ABC Airlines

| | | | | |
|---|---|---|---|---|
| PLANE NO. | 7042 | | DATE | 06/03/85 |
| A/C TYPE | B-747 | | TIME | |
| FLIGHT NO. | 24 | | 10:42 | 11:10 |

| TANK | FUEL DISTRIBUTION (LB.) | | | |
|---|---|---|---|---|
| | REQUEST | PRE SRV | ADDED | FINAL |
| RES 1 | 3350 | | 3350 | 3350 |
| MAIN 1 | 20200 | 8400 | 12000 | 20400 |
| MAIN 2 | 23550 | 12600 | 11000 | 23600 |
| CTR WING | | | | |
| MAIN 3 | 23550 | 12400 | 11250 | 23650 |
| MAIN 4 | 20200 | 8200 | 12000 | 20200 |
| RES 4 | 3350 | | 3350 | 3350 |
| TOTALS | 94200 | 41600 | 52950 | 94550 |

FUEL DELIVERED
- (MASS-LB): 52612
- (U.S. GAL): 7825

DIFFERENCE (MASS-LB): − 337

TOLERANCE (MASS-LB): 1847

FUEL TEMPERATURE
(DEG F)
MINIMUM: 76.1
MAXIMUM: 77.5

FUEL DENSITY (LB/GAL)
MINIMUM: 6.72137
MAXIMUM: 6.72626

PRESET CANCELLED
INIT OUTBOUND 82600
HYDRANT TRUCK NO. 1234
OPERATOR NO. 24563

Fig. 2.

System Start-Up And Wait Loop

Totalize Till Preset Or Preset Cancel

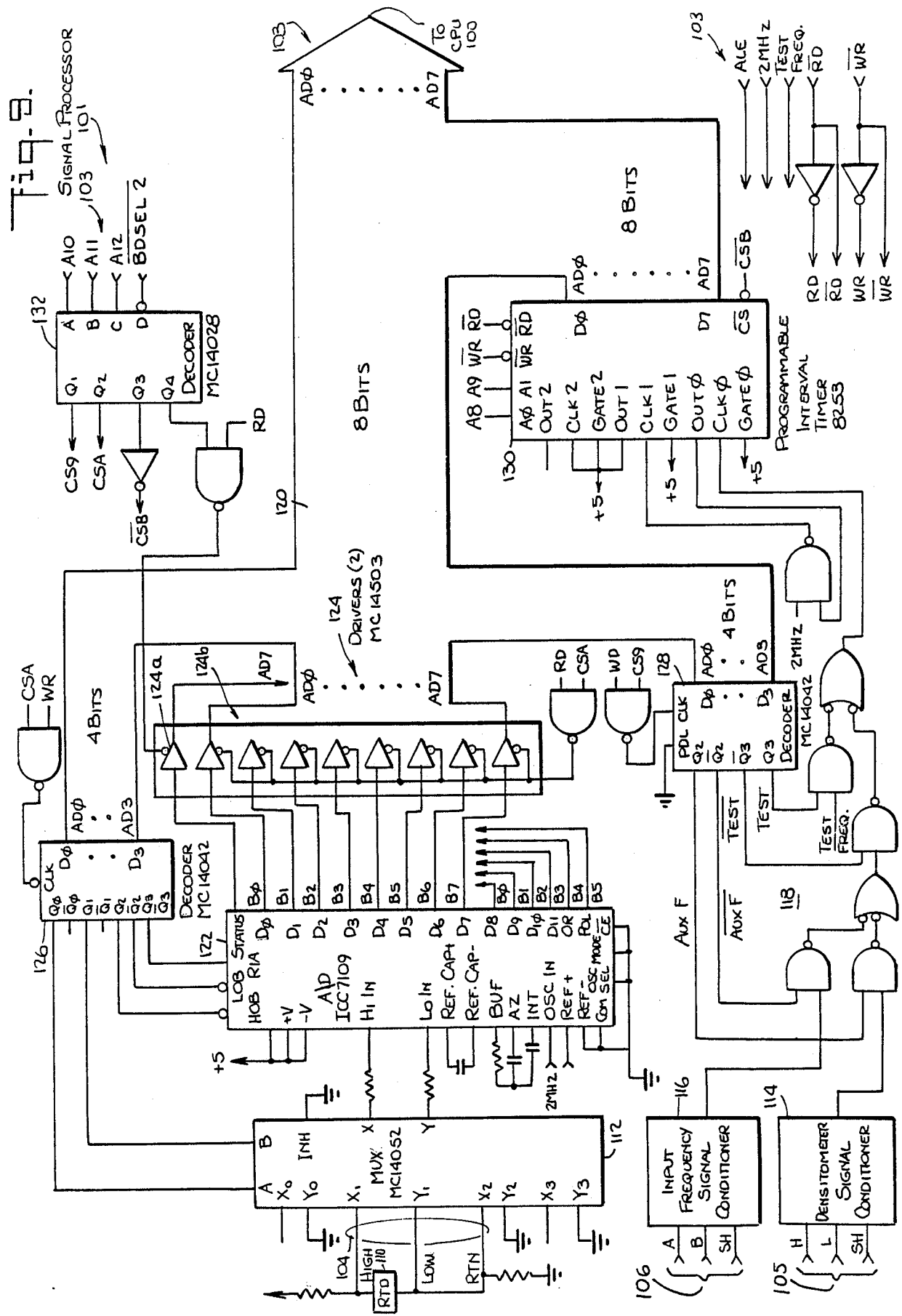

AIRCRAFT FUEL LOADING MANAGEMENT SYSTEM

BACKGROUND OF THE INVENTION

The present invention relates to a liquid fuel loading management system, particularly for loading fuel onto aircraft, and to methods for determining total fuel weight loaded and temperature standardized total fuel volume loaded.

Fuel loaded onto aircraft has typically been sold by volume. Correspondingly, inventory and control of aircraft fuel was accomplished using volumetric units. While volume measurement is relatively convenient to use for cost, inventory and control purposes, fuel quantity requirements for military and commercial aviation flights are determined by the weight of the fuel since that determines the energy content of the fuel. Thus, when determining fuel requirements for a given flight, the total weight of fuel required for the flight was computed, the weight of fuel already on board determined (usually by reading the aircraft fuel gauges), and the weight of fuel to be loaded was calculated by subtracting the weight of fuel on board from the total weight of fuel required for the flight. Since aircraft fuel requirements were typically determined by weight and loaded by volume, a conversion was performed to obtain the equivalent volume of fuel from the total fuel weight required. The conversion from weight to volume utilized an average density figure for the fuel obtained by measuring a sample of the fuel or an average density figure furnished by the fuel supplier which was corrected to take the temperature of the fuel at the time of loading into account. With this conversion, however, variations in the actual total weight of fuel loaded of about 2% to 5% occurred due to inaccurate density figures and variations in density from the average density used in the conversion process. Typically, the actual weight of the fuel loaded exceeded the desired weight to ensure that sufficient fuel was loaded. When considering the quantity of fuel loaded on current jumbo jets, particularly for long flights, the additional fuel consumption required to carry the excess fuel can be considerable. For example, a variance of only 1% in the weight of fuel loaded can amount to approximately 5,000 excess pounds of fuel on a jumbo jet fueled for a long flight. Thus, reduction in even the 1% variance in fuel weight can provide significant advantages and is highly desirable.

Systems have been proposed for automatically loading aircraft fuel by weight. One such system provided for measurement of fuel uplifted to the aircraft volumetrically as in the past with an automatic conversion to gravimetric units. In order to convert to gravimetric units, the volume of fuel being uplifted was measured, the average density of the fuel to be uplifted was provided to the system and automatically corrected as a function of the temperature of the fuel being loaded, and a gravimetric figure for the total weight of fuel loaded obtained from the measured volume and the average temperature-corrected density figure. However, the average temperature-corrected density figure used in the conversion was often not accurate and the total weight of the fuel uplifted was still not as accurate as would be desired. This system also utilized a preset for the total weight of fuel to be uplifted which automatically terminated fuel flow when the preset fuel weight was uplifted. The preset was resettable so that a previously preset fuel weight to be uplifted could be cancelled during fueling and a new preset weight entered.

In a proposed system of British Airways, the density of fuel being loaded was measured directly as was the volume of fuel being loaded, and from these measurements, the weight of the fuel loaded was determined.

True and accurate accountability for fuel disbursement by volume requires that the volume of fuel delivered be corrected to a recognized standard, e.g., to 60° F. Due to expansion and contraction of liquid with temperature variations, the volume of a given quantity of fuel will vary by a significant amount. A 20° F. shift in temperature will produce as much as 1.2% error in volume measured. Heretofore, aircraft fuel management systems did not automatically provide for such standardization.

Present aircraft include a number of fuel tanks, and to properly trim such aircraft, fuel is distributed in these fuel tanks according to schedules provided by the aircraft manufacturers. Heretofore, the distribution of the fuel among the individual fuel tanks was manually determined using the fuel distribution schedules.

There is thus a need for an aircraft fuel management system which avoids the drawbacks of prior systems including determining fuel weight from volumetric measure more accurately and automatically accomplishing more functions associated with fueling operations than prior systems.

OBJECTS AND SUMMARY OF THE INVENTION

It is an object of the present invention to provide a method and a fuel transfer management system which determines the weight of fuel transferred more accurately from a volumetric measurement.

It is another object of the present invention to provide a method and a system for converting a volume of fuel transferred to a volume normalized to a particular temperature, e.g., 60° F.

It is another object of the present invention to provide an aircraft fuel loading management system which automatically computes and indicates the distribution of fuel among the aircraft's fuel tanks for a given total quantity of fuel to be uplifted.

The invention disclosed herein is embodied in a computer-based fuel transfer management system which accurately monitors individual liquid fuel transfer transactions while providing complete and detailed records of the fuel transfer operations. The system measures and records fuel transfer in both volumetric and gravimetric quantities, and is particularly adapted for management of aircraft fuel loading.

The gravimetric measurement is made from a volumetric measurement and accurate determination of fuel density during transfer while correcting instantly for variations. When used for aircraft fuel loading, this results in a more accurate weight determination, eliminates the need for adding compensating quantities of fuel and results in savings of actual fuel usage for aircraft which may exceed 1% of the total amount of fuel loaded. These results are achieved by making the gravimetric measurement of fuel from fuel flow information, measurement of fuel density prior to transfer measurement of fuel temperature during transfer, and calculation of actual density of the fuel as it is transferred from pre-programmed density versus temperature information.

To accomplish the foregoing and other functions, the system includes a liquid flow measuring device, e.g., a flow meter, coupled to be responsive to the volume of fuel being transferred and providing a signal related thereto, a temperature sensitive device, e.g., an RTD (resistive temperature device), coupled to be responsive to the temperature of fuel being transferred and providing a signal related to the temperature of the fuel being transferred, processing means including memory means for storing information including information relating to the densities or specific gravities of liquid fuels at different temperatures, and information entering means, e.g., a keyboard, for entering information such as the initial specific gravity and temperature of the fuel to be transferred, and when used for aircraft fuel loading, aircraft information, final (outbound) fuel weight and/or total fuel weight to be loaded, total initial (preservice) fuel weight and/or initial fuel weight by tank, etc. The system also includes a display, e.g., a printer and/or electronic display, which may display information determined by the system and information entered into the system.

A control device, e.g., a solenoid-controlled hydrant valve, may be used to control fuel flow to a tank. When used, this control device is automatically controlled by the system to terminate fuel flow when the system determines that the weight of fuel loaded into the tank equals the predetermined weight of fuel to be loaded in the tank. Thus, fuel may be distributed among the various aircraft fuel tanks in accordance with the aircraft specifications to achieve balance and safety.

If desired, the total weight of fuel to be loaded which was either entered directly or determined from the total fuel weight entered may be changed during a fueling operation by cancelling the previous quantity entered and entering a new one. The system will recognize the new fuel weight to be loaded and continue fuel loading while responding to the new fuel weight. The information entering means may include a switch for entering a request to cancel a previous total fuel weight.

The weight of the fuel transferred is measured in accordance with the invention as follows. The rate of fuel flow is determined and the rate is integrated during incremental time periods to obtain incremental volumes of fuel flow. The density of the fuel which flowed for each incremental volume is determined and the weight of each incremental volume is computed from the corresponding incremental volume and the density figure for the corresponding incremental volume. Total fuel weight is then determined by summing the incremental fuel weights. A total volume measurement is obtained by summing the incremental volumes.

The density of the fuel may be determined in accordance with the invention by obtaining an initial specific gravity of the fuel and the temperature of the fuel at which the specific gravity was measured, and then correcting the initial specific gravity for changes in temperature during loading utilizing information on specific gravity and specific gravity change with temperature available for most common liquid fuels from the American Petroleum Institute ("API").

The system also provides the volume of fuel delivered corrected to a normalized temperature standard, e.g., the recognized volumetric standard of 60° F., which is accomplished automatically in accordance with the invention as follows. From the initial measured specific gravity, a fuel density normalized to 60° F. is determined using the API information relating to changes in specific gravity with temperature and equations relating density and specific gravity. The normalized volume is then obtained by dividing the total fuel weight preferably obtained as described above by the normalized density.

The invention also provides fuel tank fuel distribution information according to tank capacity and proper aircraft trim for most commonly used commercial and military aircraft types which is pre-programmed into the system. The system has the capability of automatically modifying the fuel tank fuel distribution information in accordance with changes in the density of the fuel being loaded. In operation, the initial computation of fuel load distribution by tank is based on an initial fuel request and on the fuel density at the last recorded fueling. Fuel tank fuel distribution information is made available to the operator before fuel is uplifted and also on demand during fueling. The fuel distribution information indicates changes resulting from changes in uploads or significant changes in density thereby permitting changes in the fuel distribution on a real time basis.

The system includes memory for storing all relevant information relating to a number of transactions, and this information may be transferred, either directly or through a portable memory to a central processor or another memory. All such information may be printed by the system. Thus, the system provides for inventory control of loaded fuel.

The above and other objects, aspects, features and advantages of the invention will be more readily perceived from the following description of the preferred embodiments thereof taken with the accompanying drawings and appended claims.

BRIEF DESCRIPTION OF THE DRAWINGS

The present invention is illustrated by way of example and not limitation in the figures of the accompanying drawings in which like numbers indicate like parts and in which:

FIG. 2 is a sample printout printed by the aircraft fuel loading management system of the invention upon completion of a fueling operation;

FIG. 9 is a block diagram of the signal processor of the main control unit; and

DESCRIPTION OF THE PREFERRED EMBODIMENTS

Figure 1:
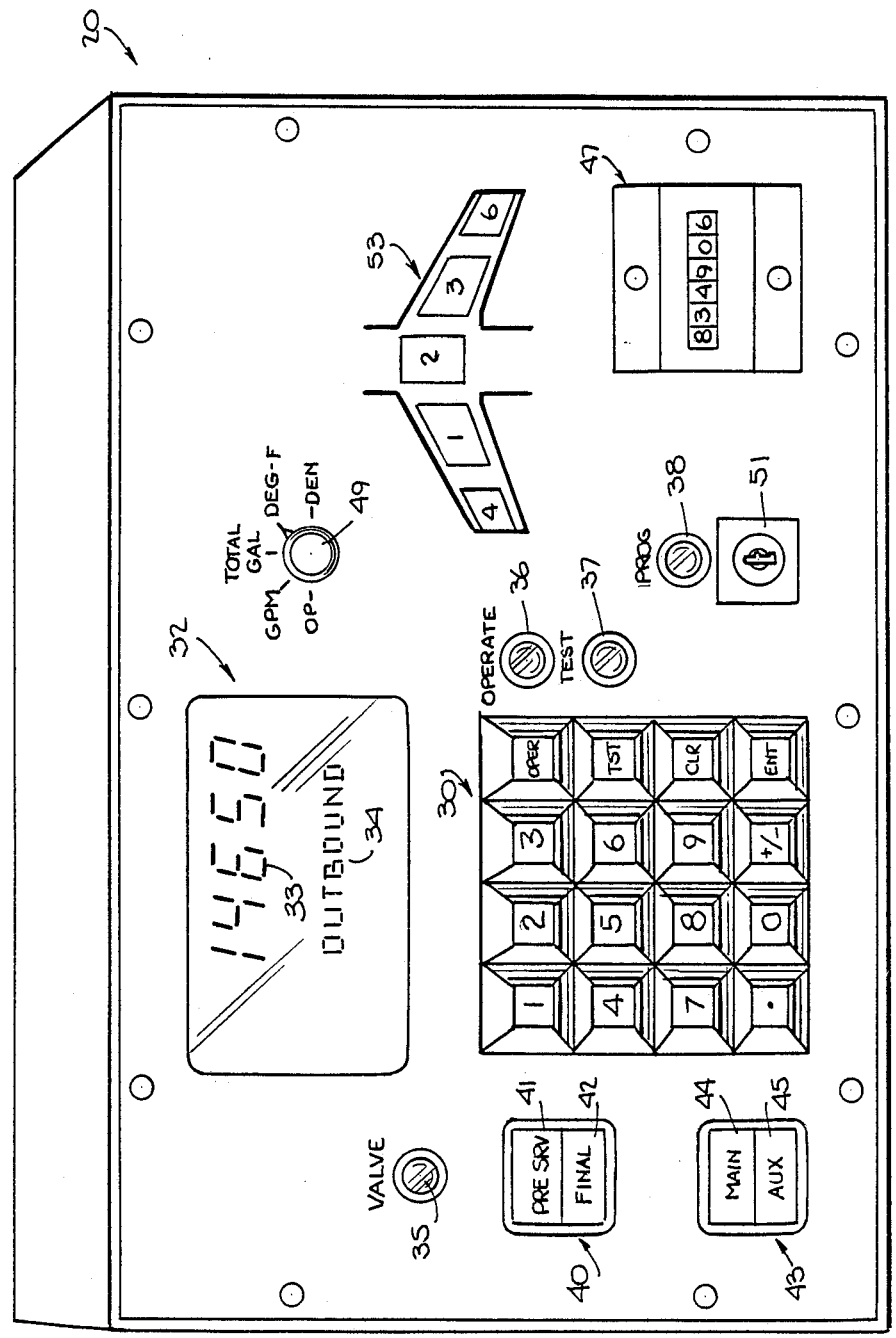
FIG. 1 is a front perspective view of the main control unit of the aircraft fuel loading management system according to the invention.
Figure 3:
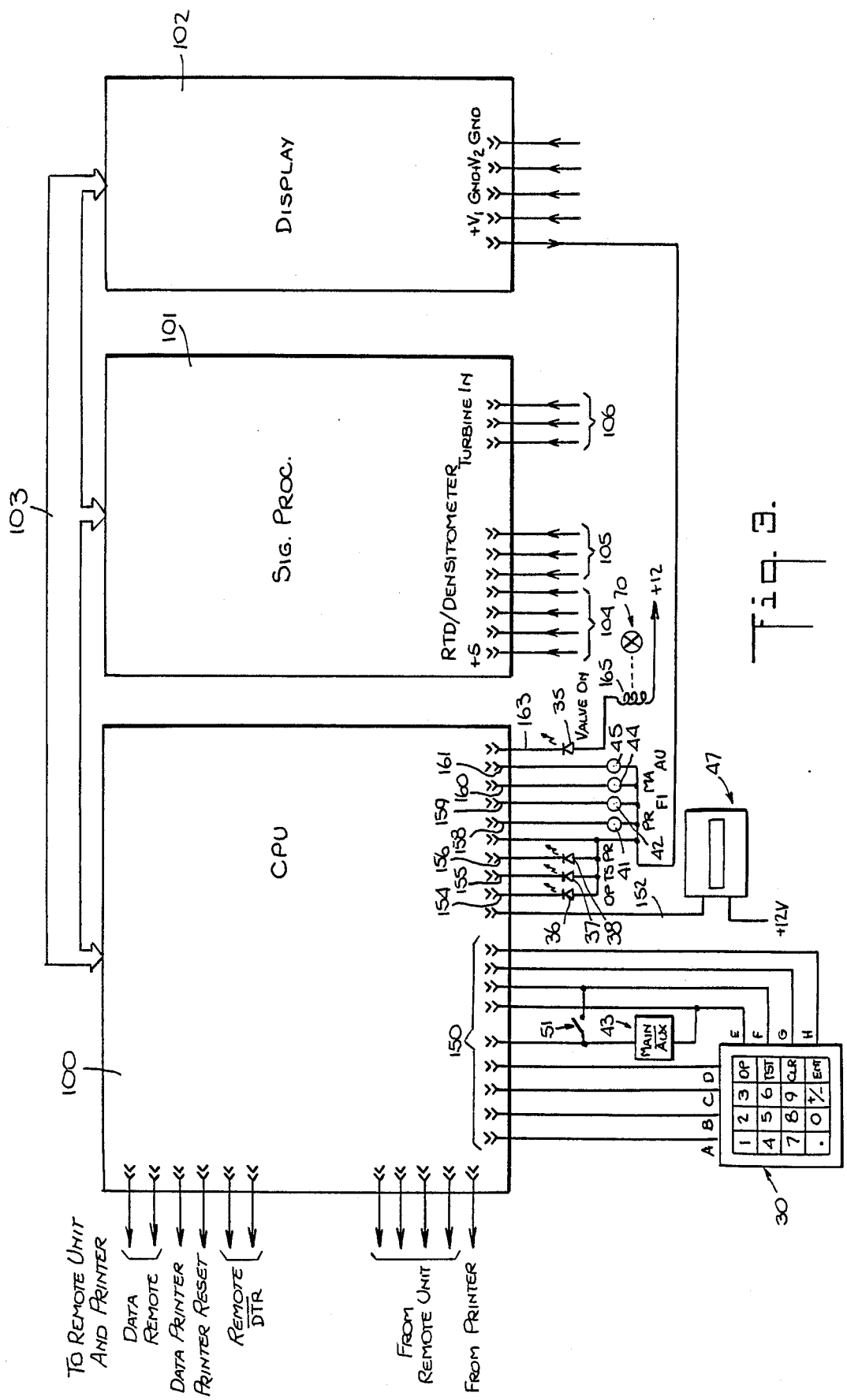
FIG. 3 is a block diagram of the main control unit depicted in FIG. 1.
Figure 4:
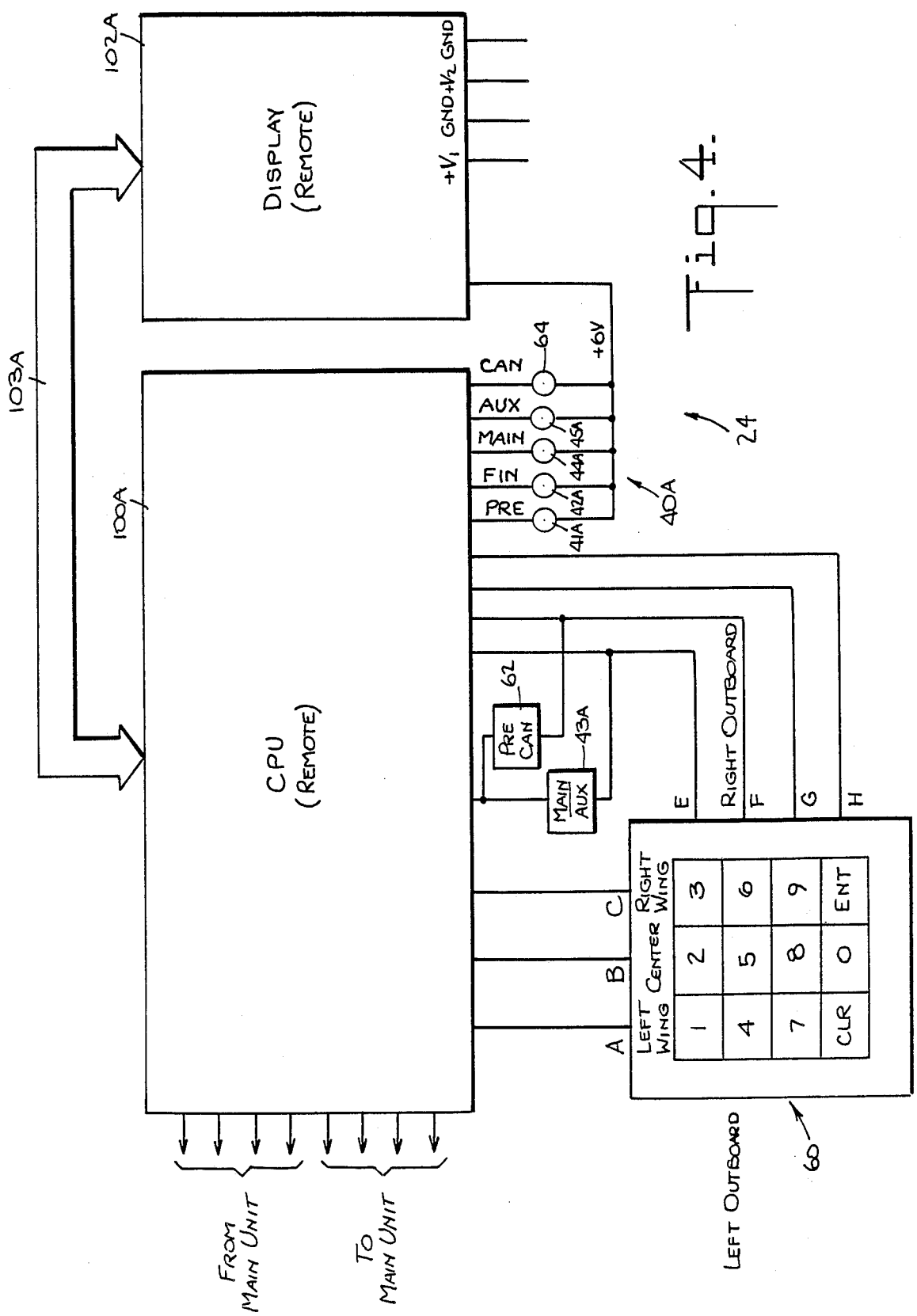
FIG. 4 is a block diagram of a remote unit forming part of the aircraft fuel loading management system.

The aircraft fuel loading management system according to the invention includes a main control unit 20 (FIGS. 1 and 3), a printer (display means) (not shown) and a remote data entry and display unit 24 (FIG. 4). Referring to FIG. 1, the front panel of the main unit 20 includes information entering means in the form of a keyboard 30 for entering information into the system, an alphanumeric display 32 (display means) including a numeric portion 33 and an alpha portion 34, light emitting diode (LED) indicators 35,36,37 and 38, preservice/final indicator 40 including individual lamp indicators 41 (PRE SRV) and 42 (FINAL), switch 43 including lamp indicators 44 (MAIN) and 45 (AUX) for indicating the position of the switch 43, a mechanical counter 47, a display select switch 49 and a key-operated security switch 51. The front panel of the main unit 20 also includes a diagram 53 identifying various fuel tanks of commercial and/or military aircraft.

The fuel loading management system is operable in an operate mode and a program mode. In order to enter the program mode, the key-operated security switch 51 must be activated. Entry into the operate mode is accomplished by means of the "OPER" key of the keyboard 30. The system in the operate mode operates in either a preservice submode or a final submode. In the preservice submode, the PRE SRV indicator 41 is lit and the system is interactive to permit entering of information relating to a fuel servicing operation to be performed and to display information entered and information provided by the system. In the final submode, the FINAL indicator 42 is lit and the system controls a fuel loading operation.

Switch 43 is a single pole, single throw switch which conditions the system to display fuel tank information for either the main or the auxiliary fuel tanks of the aircraft being fueled. When switch 43 is in the position for displaying main fuel tank information by the system, the MAIN indicator 44 is lit, and when in position for displaying auxiliary fuel tank information, the AUX indicator 45 is lit.

The display 32, which may be an LED segment display, a segment tube display, etc., may be used to display at appropriate times, a number of parameters in the operate mode when the display select switch 49 is switched to the OP position, or the specific parameters: gallons per minute, total gallons, degrees F and density, when the display select switch 49 is switched to the GPM, TOTAL GAL, DEG F and DEN positions, respectively.

The mechanical counter 47 indicates the total number of gallons of fuel loaded under control of the system for all fuel loading operations controlled by the system, i.e., the mechanical counter 47 is not reset after each fuel loading operation.

The front panel (not shown) of the remote unit 24 is similar to the front panel of the main unit 20 depicted in FIG. 1 and includes a keyboard 60 (information entering means), a display 32A (display means) similar to display 32 of the main unit, a PRE SRV/FINAL indicator 40A with associated lamp indicators 41A and 42A similar to indicator 40 of the main unit, a MAIN/AUX switch 43A and associated lamp indicators 44A,45A similar to switch 43 of the main unit, and a preset cancel (PRE CAN) switch 62. The front panel of the remote unit 20 does not include the LED indicators 35 through 38, the security switch 51, the mechanical counter 47 and the display select switch 49 of the main unit. The keyboard 30 of the main unit 20 and the keyboard 60 of the remote unit 24 differ, the keyboard 30 having a 4×4 keypad configuration and the keyboard 60 having a 3×4 keypad configuration. The remote unit keyboard 60 does not include the OPER, TST, +/− and decimal keypads of the main unit keyboard 30. Also, in the remote unit 24, the legends "LEFT WING", "CENTER", "RIGHT WING", "LEFT OUTBOARD" and "RIGHT OUTBOARD" appear adjacent keypads 1, 2, 3, 4 and 6, respectively, to correlate identification of fuel tank numbers (main or auxiliary depending on the position of switch 43) and their location as identified on the front panel of the main unit. The preset cancel switch 62 of the remote unit is used to cancel a preset weight of fuel which the system has been conditioned to uplift to an aircraft, and to permit entry of further information which enables the system to control uplifting of a revised preset weight of fuel.

Inclusion of a remote unit in the system is optional as all control and display functions may be provided at the main unit. However, for a system which does not include the remote unit 24, the CLR keypad can be used to enter a preset cancel at the main unit, as is in a system which includes both a main unit and a remote unit.

Figure 5:
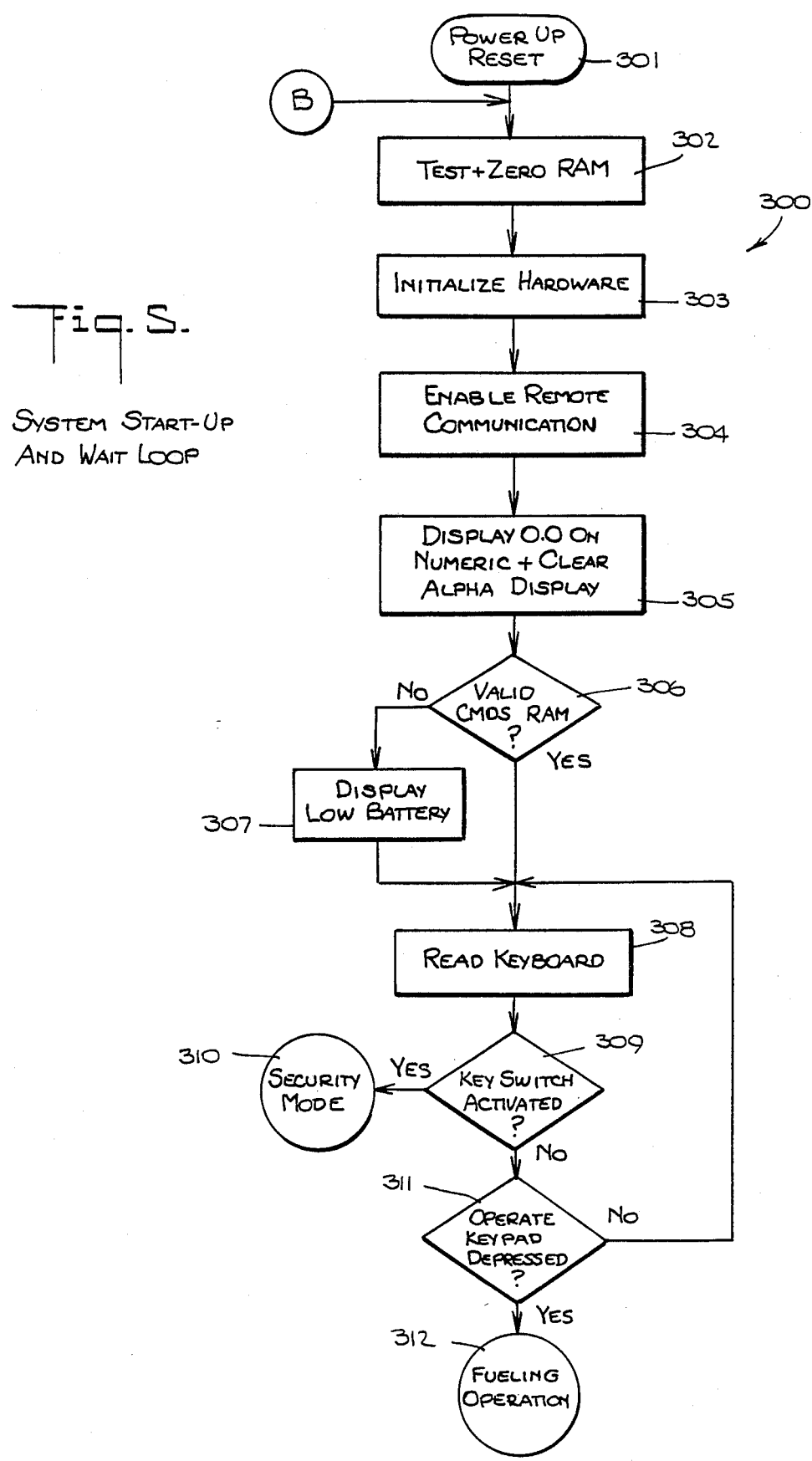
FIG. 5 is a flow chart illustrating initial operation of the aircraft fuel management system according to the invention.

Operation of the system is illustrated in the flow charts of FIGS. 5 through 8. Referring first to FIG. 5, the flow chart 300 illustrates the system start-up and wait loop. A power-up reset is applied to selected system components in step 301 when power is initially applied to the system, followed by testing and zeroing of the system's random access memory (RAM) 199 (FIG. 10) in step 302. The system's hardware, i.e., its circuits, keyboard(s) and switch outputs, and indicators, are initialized in step 303, and communication between the remote unit 24 and the main unit 20 and between the main unit 24 and the printer are enabled in step 304. In step 305, "0.0" is displayed on the numeric portion 33 of the display 32 and the alpha portion 34 of the display 32 is cleared. The battery supply to the system's RAM 199 is tested in step 306 and if it is low, "LOW BATTERY" is displayed in step 307 on the alpha display portion 34. Thereafter the main unit keyboard 30 is read in step 308 and the security switch 51 read in step 309. If the security key switch 51 has been activated, the system proceeds to the security mode 310. If not, the system determines whether the OPER key has been depressed in step 311. If the OPER key has been depressed, the system proceeds to a fueling operation 312. If the OPER key was not depressed, the system reverts to step 308 and reads the keyboard 30 again, and repeats steps 309 and 311 until the OPER key is depressed or the key switch 51 is activated.

Figure 6A:
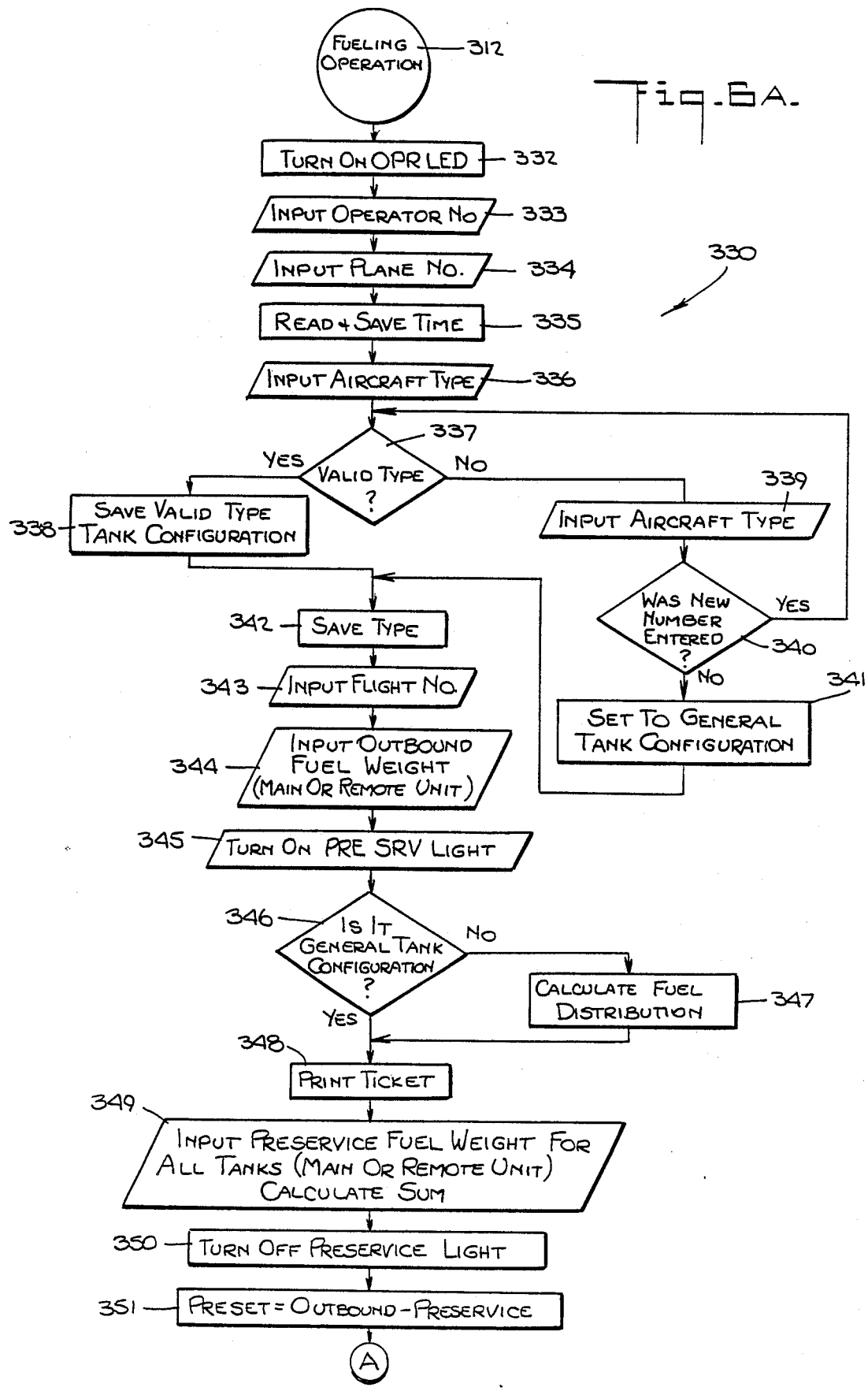
FIG. 6, consisting of FIGS. 6A and 6B, is a flow chart illustrating operation of the aircraft fuel management system in a fueling operation.
Figure 6B:
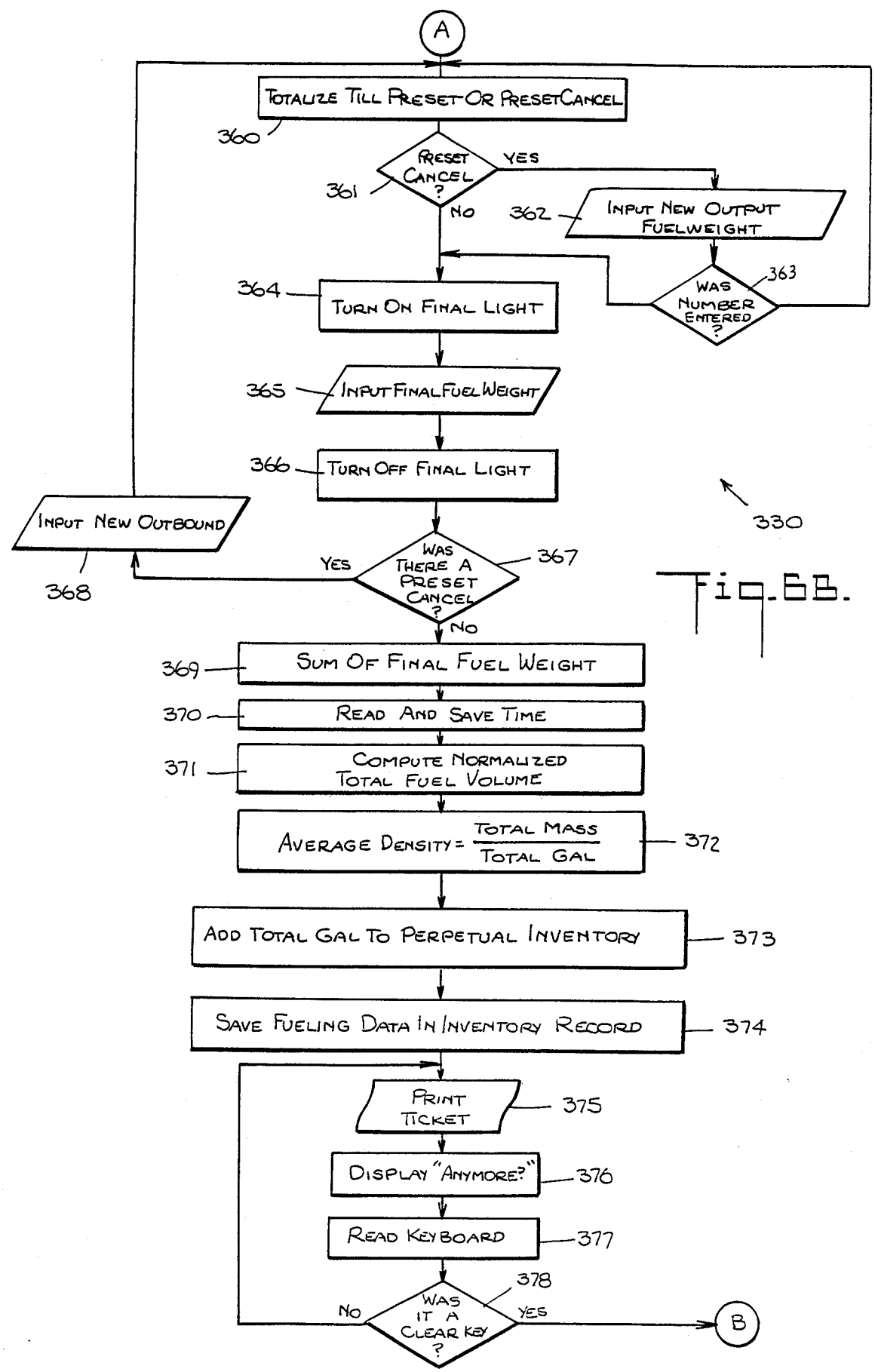
Figure 10A:
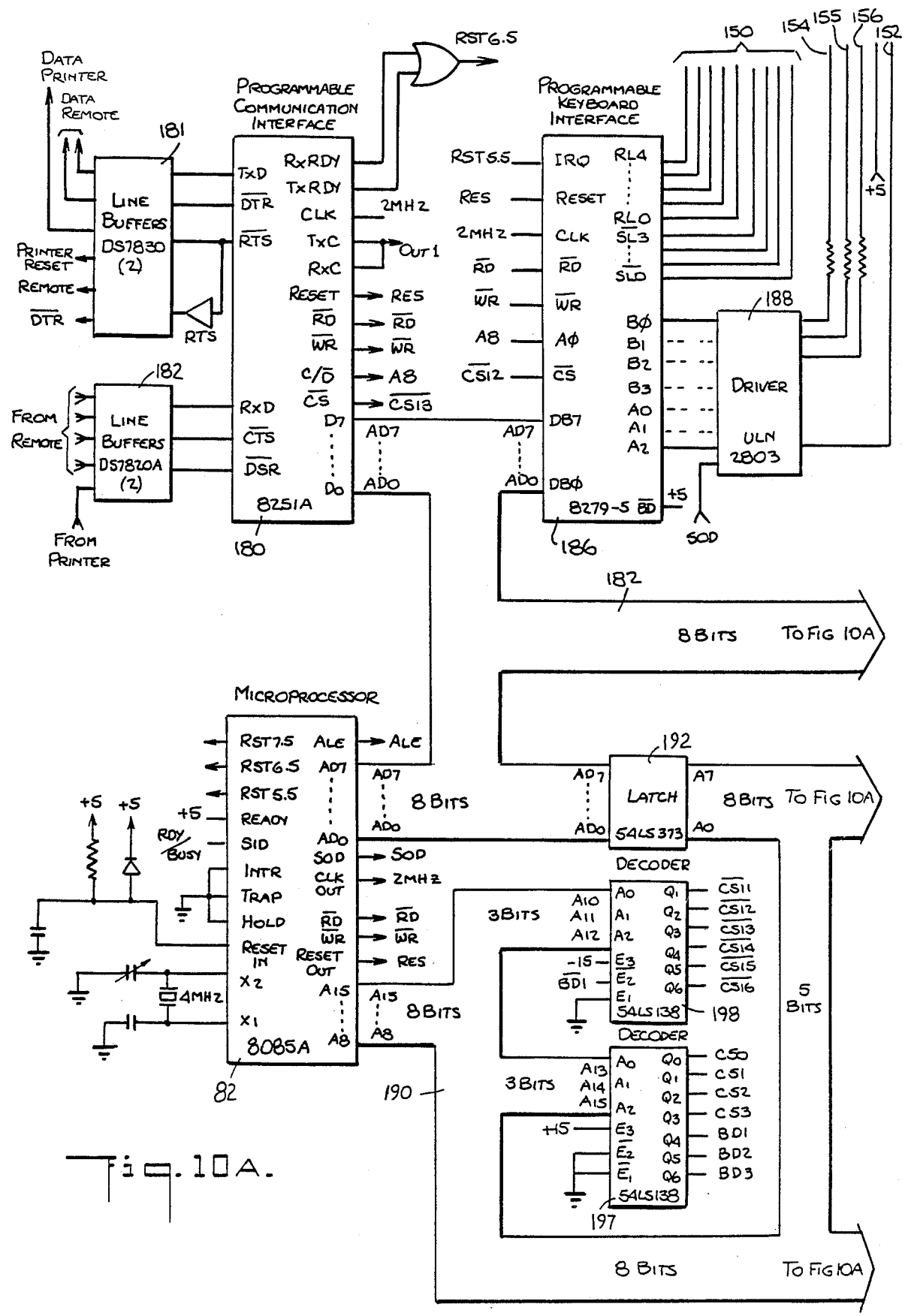
FIG. 10 consisting of FIGS. 10A and 10B, is a block diagram of the central processing unit of the main control unit.
Figure 10B:
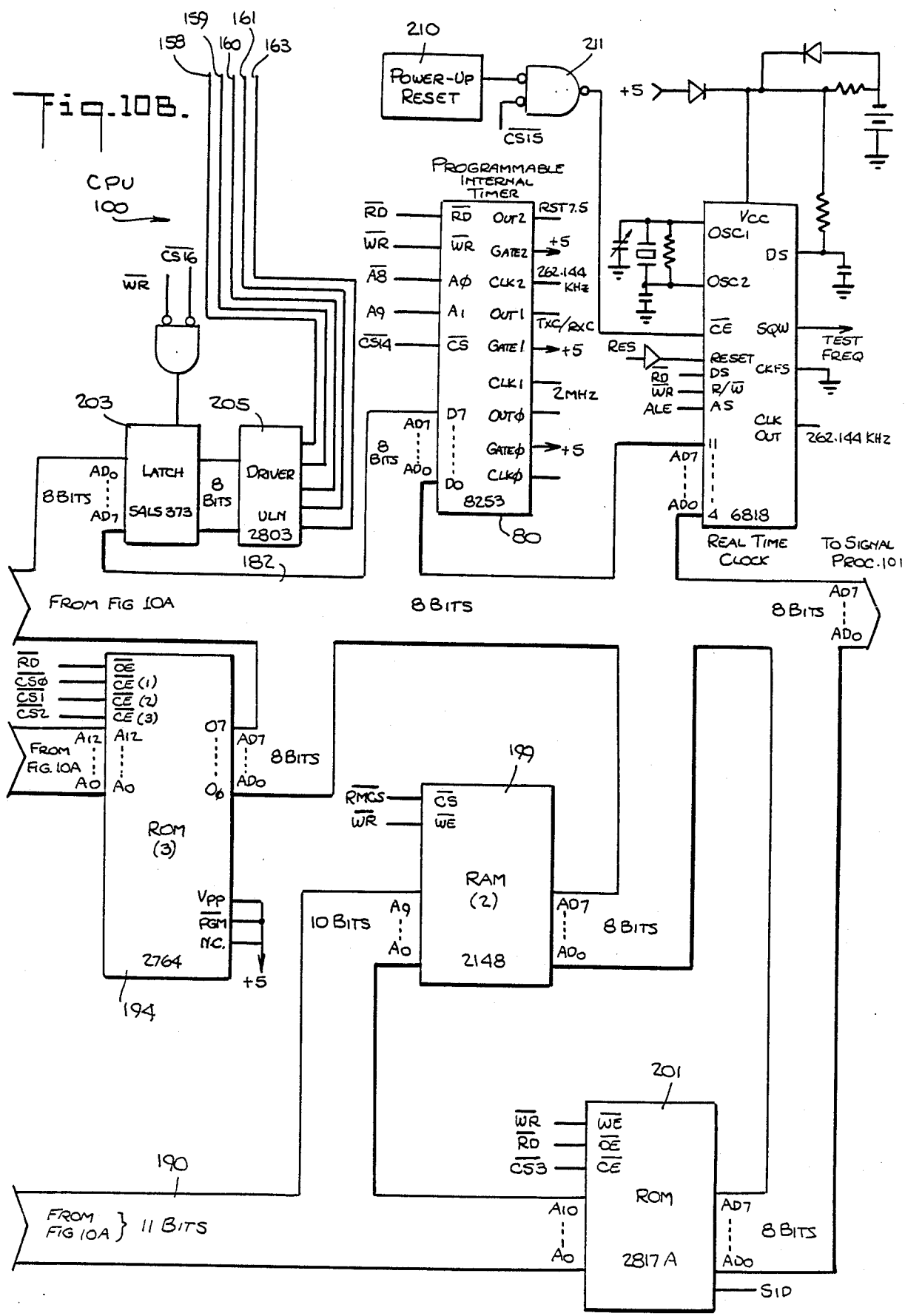

Referring to FIGS. 6A and 6B, flow chart 330 illustrates the fueling operation 312 of the system. When the system proceeds to a fueling operation 312 (FIGS. 5 and 6A) in the operating mode, then the OPR LED indicator 36 is turned on in step 332, and the alpha portion 34 of the display 32 prompts for the operator to input and the system receives his operator number in step 333 and the plane number in step 334. In step 335, the system reads and saves the time of day and in step 336 causes the alpha portion 34 of the display 32 to prompt for inputting the aircraft type. Upon receiving the aircraft type in step 336, the system in step 337 determines whether it is a valid aircraft type by comparison with stored information in the system read only memory (ROM) 201 (FIG. 10). If the aircraft is a valid type, the tank configuration of the valid type aircraft is read from ROM 201 and saved in step 338. If it is not, the system causes a prompt on the alpha portion 34 of the display 32 for the entry of the aircraft type again in step 339. The system in step 340 determines if a new number was entered. If one was not, the system is set to operate with a general tank configuration in step 341, i.e, fuel distribution by tank information will not be provided by the system. If a new number was entered, the system reverts to step 337 to determine whether the aircraft is a valid type or not. In step 342, the aircraft type entered by the operator is saved and in steps 343 and 344, the system causes the alpha portion of the display 32 to prompt for inputting of the aircraft flight number and for inputting the total outbound fuel required, respectively. Upon receiving this information at either the remote unit 24 or the main unit 20, the system turns on the PRE SERV lamp indicator 42 in step 345. In step 346, the system determines whether the fuel tank configuration was set to general or not. If it was not set to general, fuel distribution is computed by the system for specific fuel tank configuration of the aircraft type entered in step 346.

The fuel distribution computation is made using algorithms including a look-up table routine derived from information provided by the aircraft manufacturers which specifies the amount of fuel to be present in each tank for a total onboard fuel weight. Specifically, the aircraft manufacturers publish tables listing the quantity of fuel to be present in each tank for a number of total onboard fuel weights in increments of several hundred pounds of total fuel weight. This table information and the algorithms, which are stored in the system's ROM 201, provide the fuel quantity for each tank, i.e., fuel distribution, given a total onboard fuel weight. Such algorithms can be generated by one of skill in the art from the information contained in the aircraft manufacturers' tables, and programming for carrying out the algorithms can be fabricated by one of skill in the art.

In step 348 of the FIG. 6A flow chart, the system causes a ticket to be printed by the printer prior to commencement of fueling which indicates the total fuel which each fuel tank is to contain upon completion of the fueling operation. The fuel distribution print out is similar to the one printed on the ticket of FIG. 2, which is printed after a fueling operation. In step 349, prompts are provided in the alpha portion 34 of the display 32 for inputting the individual total quantities of fuel present in the individual aircraft tanks, i.e., preservice fuel, and the system calculates the total preservice fuel on board the aircraft from the individual totals. The preservice fuel present in the individual fuel tanks may be input at the remote unit 24 or at the main unit 20. At this point, all preservice information has been input into the system and the PRE SRV lamp indicator 41 is turned off in step 350. In step 351, the system calculates the preset quantity of fuel to be uplifted to the aircraft by subtracting the preservice total from the outbound total.

The system next proceeds to point A in the flow chart of FIG. 6B. In step 360, the system opens a solenoid controlled fuel flow or hydrant valve 70 (FIG. 3) by completing a circuit which applies an energizing voltage thereto, permitting fuel to be uplifted to the aircraft in a "totalize to preset or preset cancel routine" ("totalize routine") until the preset weight of fuel has been loaded or the preset cancel switch 62 on the remote unit has been depressed. At the same time, the VALVE LED indicator 35 is lit. In the totalize routine of step 360, incremental weights and volumes of fuel being loaded are determined, as described below in connection with the flow charts of FIGS. 7 and 8.

In step 361, the system determines if the preset cancel switch 62 was depressed. If it was, the system causes the alpha portion 34 of the display 32 to prompt for inputting a new outbound fuel weight in step 362. If a number is entered in response to the prompt, as determined in step 363, the system reverts to point A and continues in the totalize routine of step 360. If a number was not entered in step 362, the system in step 364 turns on the FINAL indicator lamp 42, and in step 365 causes the alpha portion 34 of the display 32 to prompt for inputting the final total fuel figures read from the individual aircraft fuel tanks. After these figures have been entered in step 365, the system causes the FINAL indicator lamp 42 to be turned off in step 366. The system in step 367 again determines whether the preset cancel switch 62 was depressed, and if it was, the system causes the alpha portion 34 of the display 32 to prompt for inputting a new total outbound fuel weight in step 368. When the new outbound fuel weight has been entered in step 368, the system reverts to point A and the totalizing routine continues in step 360. If the preset cancel switch 62 was not depressed, the total final weight and volume of fuel uplifted is computed in step 369 by summing the incremental fuel weights and volumes as described below. In step 369, the time of day is read and saved.

The system in step 370 normalizes the total volume of fuel delivered to a "standard" volumetric measure referenced to 60° F. Normalization requires that the temperature of the delivered fuel and its specific gravity be known. Accordingly, the specific gravity of the fuel is measured at one temperature and entered as described below, and changes in specific gravity with temperature are computed in accordance with data provided by the American Petroleum Institute, which also provides data tables for performing the normalization to standard volumetric measure. Heretofore, normalization required an average temperature of the total fuel delivered to be computed, and the total volume of fuel delivered normalized as corrected by this average temperature in accordance with the API tables. In accordance with the invention, the change in specific gravity with temperature of a plurality of fuels derived from the API tables is stored in the system ROM 201 (FIG. 10), and normalization is made by computer instantaneously with temperature correction and performed while the fuel is flowing. When considering the temperature transients due to gradients along the delivery path, the invention offers a far more precise overall normalization.

In order to normalize the volume of fuel delivered, the system is provided with the specific gravity of the fuel and temperature at which the specific gravity was measured. These parameters are typically measured on a daily basis, but may, if desired, be measured prior to each fueling operation, and are entered by activation of key switch 51 (FIG. 1). This places the system in the security mode 310 (FIG. 5). The operator then selects the memory location address for measured specific gravity and the system prompts for input of specific gravity, followed by a prompt for input of the temperature at which the specific gravity was measured. The system then calculates (while still in the security mode) the density at 60° F. from the temperature of the fuel being loaded and the stored API information, and stores the 60° F. normalized density figure. The normalized density is computed using the following equation:

$$\text{Density}_{(60)} = 8.328 \, (\text{Sp.Gr.}_{prog.} + (\text{temp.}_{prog.} - 60) \, \text{Sp.Gr.slope})$$

where 8.328 equals the weight of water at standard atmospheric pressure and 60° F.; $\text{Sp.Gr.}_{prog.}$ is the measured specific gravity; and Sp.Gr.slope is the change in specific gravity per degree fahrenheit. This normalized density figure is then used in step 370 to perform the volumetric correction and provides the volume quantity of fuel delivered normalized to 60° F., which for gallons is calculated from the following equation:

$$\text{Std. gal.} = \frac{\text{mass-weight}}{\text{Density (60)}},$$

where mass-weight is the weight of the final fuel computed in step 368.

In step 371, the average density of the fuel uplifted to the aircraft is computed from the total mass of the fuel uplifted, and in step 368 the total number of gallons uplifted is obtained. The average density is saved by the system and used as an initial density in connection with distribution of fuel in the aircraft's tanks in the next fueling operation, as described below. In step 372, the total gallons of fuel uplifted is added to the perpetual inventory and the mechanical counter 47 is correspondingly incremented. In step 373, the fueling data is stored in the system's random access memory (RAM) 199 (FIG. 10) for inventory purposes and in step 374, the ticket depicted in FIG. 2 is printed. After the ticket is printed, the system causes the alpha portion 34 of the display 32 to display the prompt "ANY MORE?" in step 375 and the keyboard 30 or 60 to be read in step 376. If the CLR key was depressed as determined in step 377, the system reverts to point B in the flow chart of FIG. 5, and if the CLR key was not depressed the system reverts to step 374 and prints another ticket. This loop may be used to print additional tickets. Since the system stores fueling information for each transaction in step 373, if desired, the information may be transferred to a data storage device or a data processor. Preferably, the stored information is transferred to a portable memory module (not shown) which may then be used to transfer the information to a data processor or another data storage device.

Figure 7A:
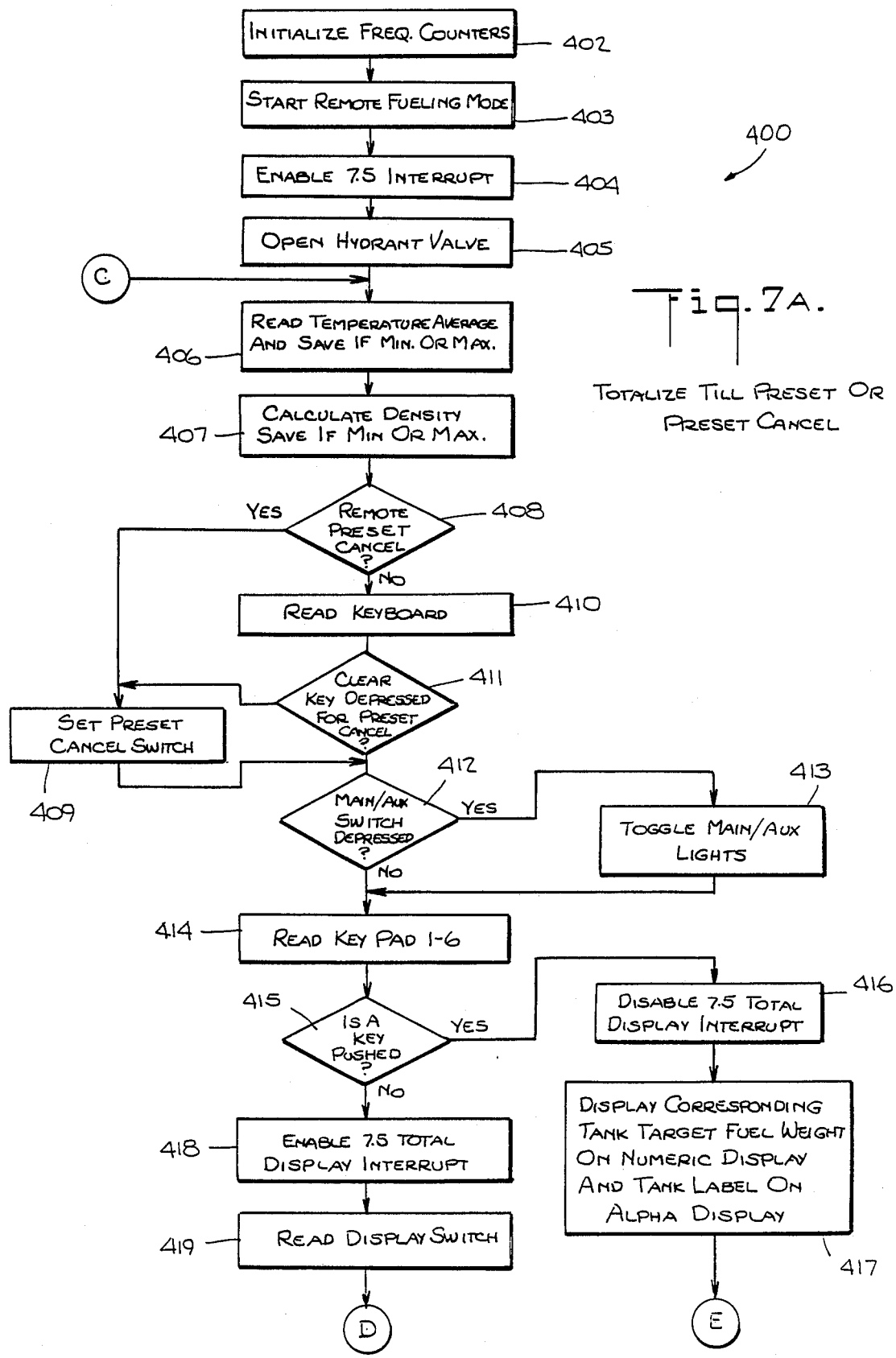
FIG. 7, consisting of FIGS. 7A and 7B, is a flow chart illustrating operation of the aircraft fuel management loading system in a totalized to preset or preset cancel routine of the fueling operation.
Figure 7B:
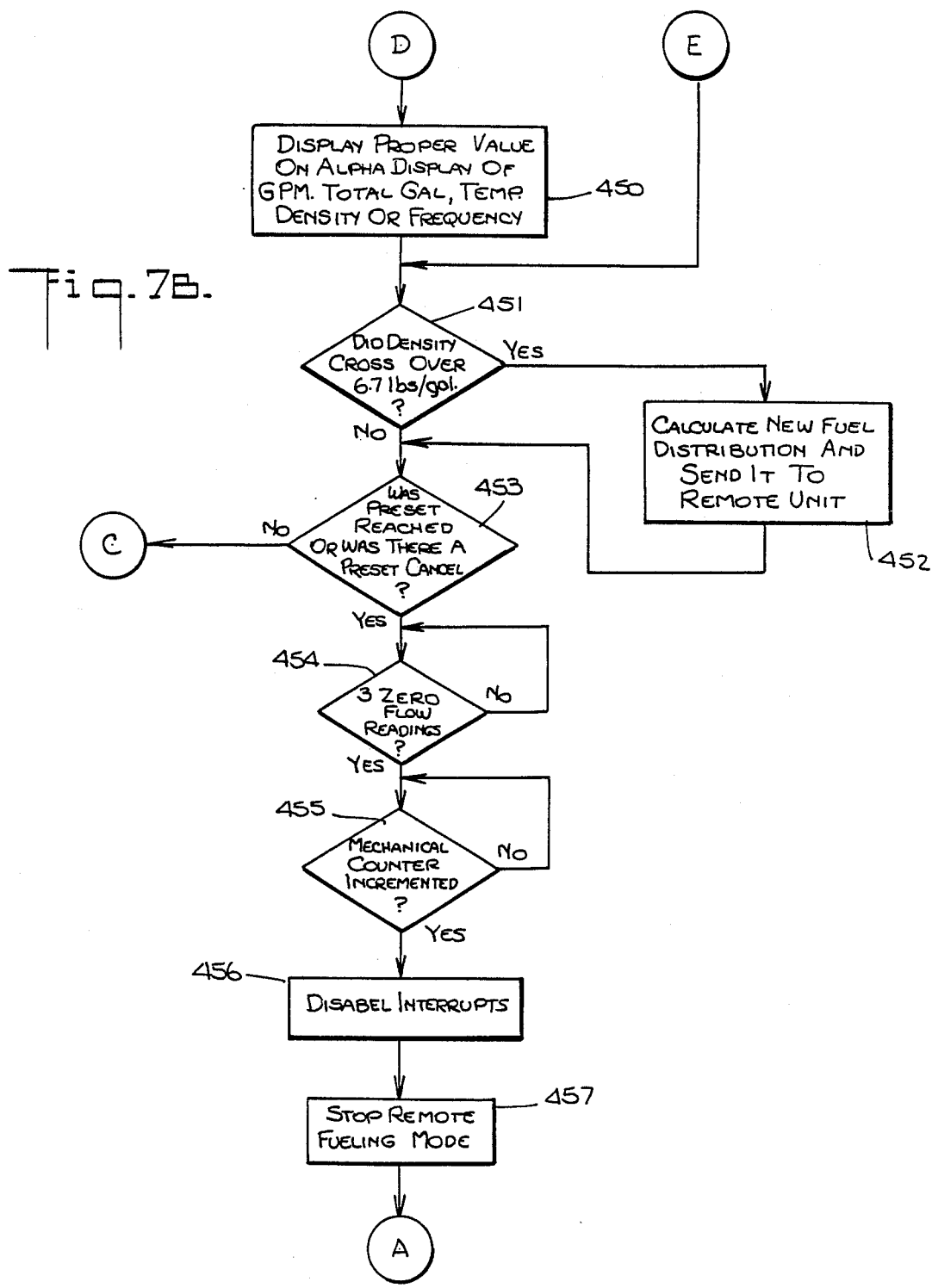

Referring now to FIGS. 7A and 7B, the flow chart 400 illustrates operation of the system in the totalize routine of step 360 in the flow chart of FIG. 6B. Referring to FIG. 7A, in step 402, frequency counters coupled to receive the frequency output of a flow meter (liquid volume measuring device) are initialized in a programmable interval timer 80 (FIG. 9) in the main unit. In step 403, the system is caused to enter the remote fueling routine in which the system can be controlled by the remote unit 24. In step 404, the interrupt designated "7.5" to the microprocessor 82 in the main unit (see FIG. 10) is caused to be enabled. The "7.5" interrupt causes the microprocessor to measure the weight and volume of fuel being loaded as described below, and to display on display 32 in step 419 the total volume of fuel loaded as it is being loaded. In step 405, the hydrant valve 70 is opened to commence the flow of fuel to the aircraft. During fueling, the temperature of the fuel being loaded is periodically read in step 406 and the read temperature is saved if it is a minimum or maximum temperature. In step 407, the density of the fuel being loaded is calculated from initial density information entered into the system, the volume of fuel being loaded and the fuel temperature. If the calculated density is a minimum or maximum value, it is saved in step 407. The minimum and maximum temperature and density values are printed on the final ticket depicted in FIG. 2 for informational purposes.

In step 408 in the FIG. 7A flow chart, the system determines if the remote preset cancel switch 62 has been depressed. If it has, the preset cancel switch 62 is set in step 409. If it has not, the keyboard 30 is read in step 410 to determine in step 411 if the CLR key in the main unit 20 was depressed as an alternative method of entering a preset cancel. If the CLR key has been depressed, the preset cancel switch 62 is set in step 409. The system next determines in step 412 whether the MAIN/AUX switch 43 has been depressed, and if it has been, the MAIN indicator lamp 44 and the AUX indicator lamp 45 are toggled in step 413 to light the MAIN indicator lamp 44. If it has not been, the lamp that is then lit remains lit. Display of individual fuel tank information will then correspond to either the main or auxiliary fuel tanks as indicated by which of the indicator lamps 44 or 45 is lit. Next, keypads 1-4 and 5 of the remote unit keyboard 60 are read in step 414 to determine if the operator is requesting individual fuel tank information to be displayed. In step 415, the system determines whether any of these keys has been pushed, and if one or more have, the "7.5" interrupt to the microprocessor 82 is disabled in step 416 to disable the total gallons display, and the system in step 417 causes the target fuel for the tank identified by each of the depressed keys (1-4 and 6) and the lit indicator lamp 44 or 45 to be displayed on the numeric portion of the display and the respective tank (1-4 and 6) to be identified on the alpha portion of the display. The system then proceeds to point E in the flow chart of FIG. 7B. If none of keys 1-4 and 5 were detected to be pressed in step 414, the "7.5" interrupt is enabled in step 418 and the display switch 49 read in step 419. If switch 49 is in the TOTAL GAL position, the total volume of fuel loaded is displayed. The system then proceeds to point D in the flow chart of FIG. 7B.

Referring to FIG. 7B, in step 450, the system causes the proper value to be displayed on the numeric portion 33 of the display and the parameter whose value is being displayed to be indentified in the alpha portion 34 of the display in accordance with the position of the display select switch 49. In step 451, the system determines whether the density crossed over 6.7 lbs/gal., i.e., whether during fueling, the density changed from an initial value above 6.7 lbs/gal. to a value below 6.7 lbs/gal. or vice versa. The initial density value used is an average density computed and stored by the system as described below for the last fueling operation. If the density crosses 6.7 lbs/gal., the system in step 452 calculates a new final fuel distribution for the individual aircraft fuel tanks as described above but using fuel density information corresponding to the changed density which is stored in ROM 201, and sends the final fuel distribution to be displayed on the remote unit 24. If the density does not cross 6.7 lbs/gal., the system proceeds directly to step 453 where the system determines whether the preset final fuel weight value was reached or whether there was a preset cancel. If the preset fuel weight was not reached and there was not a preset cancel, the system proceeds to point C in the flow chart of FIG. 7A and fueling is continued. If the preset fuel weight was reached or there was a preset cancel, the system determines in step 454 whether the flow of fuel has been terminated by determining whether there have been three consecutive zero flow readings. If there have not been three consecutive zero flow readings, the system continues to check for this condition. If there have been, the system proceeds to step 455 where the system determines whether incrementing of the mechanical counter 47 has been completed. When incrementing of the mechanical counter 47 has been completed, the "7.5" interrupt to the microprocessor 80 is disabled in step 456, the system terminates the remote fueling routine in step 457 and returns to point A in flow chart 330 in FIG. 6B.

Figure 8:
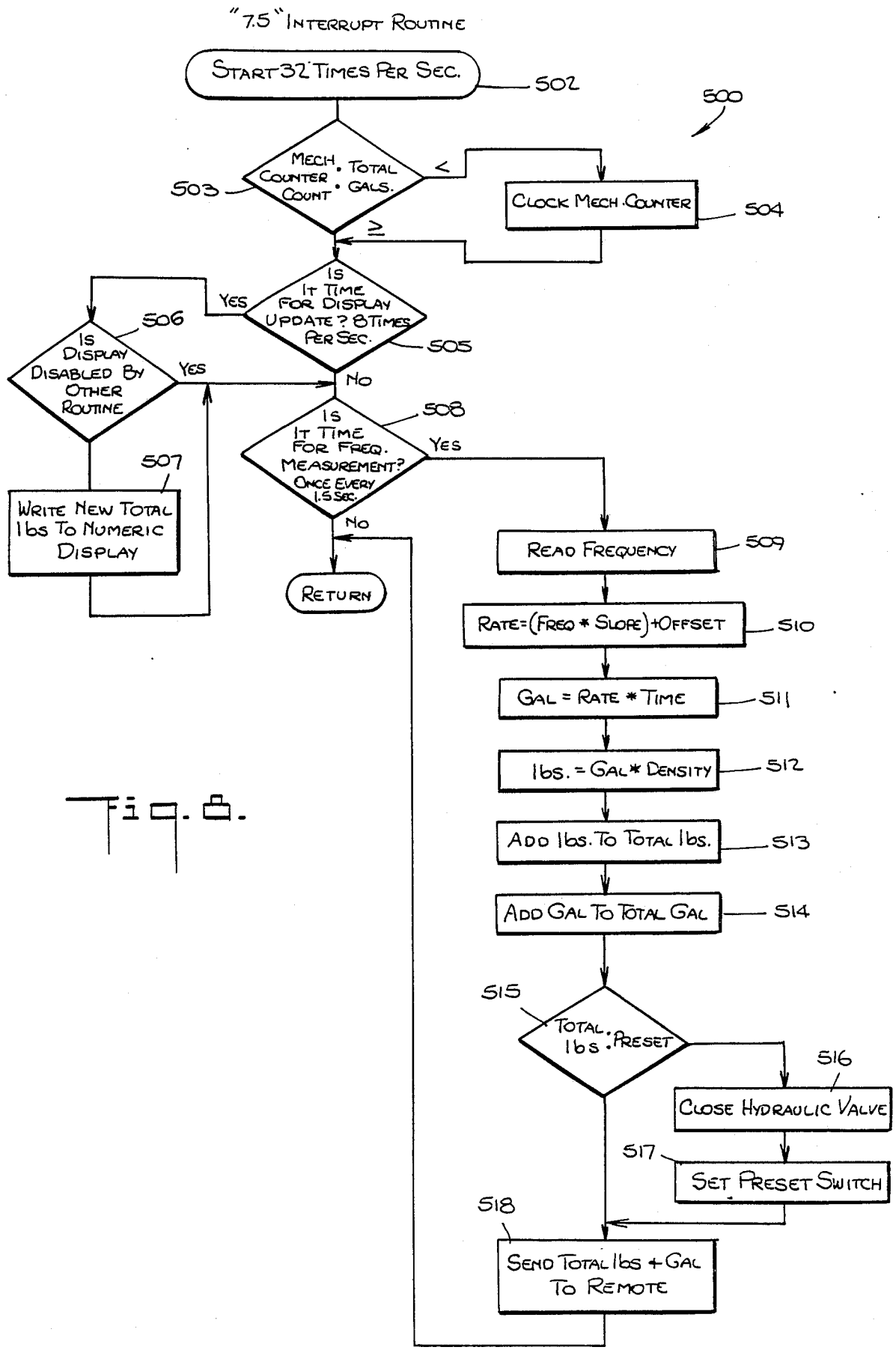
FIG. 8 is a flow chart illustrating operation of the aircraft fuel management system in the totalizing step of the totalized to preset or preset cancel routine of FIG. 7.

The flow chart 500 depicted in FIG. 8 represents step 418 in the FIG. 7A flow chart for determining and displaying total fuel weight. In step 502, the system enters the total fuel weight subroutine 32 times per second and in step 503 compares the total gallons reading on mechanical counter 47 less the reading prior to the current fuel loading operation with the total gallons of fuel loaded during the current fuel loading operation as determined by the system. If the reading related to the mechanical counter 47 is less than the total gallons loaded, the mechanical counter 47 is clocked to increment it in step 504. If the mechanical counter reading is less than the total gallons loaded, the routine proceeds to step 505 where the system determines whether the display 32 is to be updated or not. The display is updated eight times per second. If the display 32 is to be updated, the system first determines in step 506 whether the display is disabled by any other routine. If it is not, the total weight is updated in the numeric portion 32 of the display 32 in step 507, and if it is, the display is not updated. In either case, the routine proceeds to step 508 where the system determines whether 1.5 seconds has elapsed since the last flow meter frequency measurement. If 1.5 seconds has not elapsed, the routine returns to step 502. If 1.5 seconds has elapsed, then the system computes the incremental fuel weight and volume loaded during the current 1.5 second time period in steps 509 through 512 and the total fuel weight and volume loaded in steps 513-514.

In a conventional totalizing system each pulse output or revolution of the flowmeter represents some increment of total fuel volume. In the fuel loading system of the invention, the frequency pulse input information is used to compute precise rate of flow information. Rate of flow then goes through a mathematical integration which yields total fuel volume. The integration is performed through an incremental summation (approximately every 1.5 seconds) in response to the "7.5" interrupt to the microprocessor 82. Therefore, every 1.5 seconds an update of the total fuel volume loaded takes place. This volumetric increment is converted to mass weight using density information computed from measured temperature and stored specific gravity data, and also totalized to provide the total weight of the fuel loaded. A running total of both actual volume measured and mass-weight computed is maintained and can be displayed.

Referring to FIG. 8, incremental fuel weight and volume are determined in steps 509-512. The rate of fuel flow is determined by reading the flow meter output in step 509 and computing the rate of flow in step 510 from the flow meter frequency, the slope of the flow meter frequency curve and the flow meter offset, parameters which are available for different flow meters and stored in the system's ROM 201. The incremental volume is determined in step 511 by integrating the flow rate (rate * time) over the 1.5 second interval, and the incremental weight is obtained in step 512 from the incremental volume and the density of the fuel in the incremental volume. The density is obtained from an initial specific gravity, changes in temperature of the fuel during loading and API information as described herein. In steps 513 and 514, the incremental fuel weight and fuel volume, respectively, are added to the previous totals to obtain the current fuel weight and volume.

In step 515, the total final weight is compared to the preset fuel weight. If the total weight is greater or equal to the preset weight, then the hydrant valve 70 is closed in step 516 and the preset cancel switch 62 is set in step 517. The system then proceeds to step 518 where the total fuel weight and volume are sent to the remote unit 24. If in step 515 the total loaded fuel weight is determined to be less than the preset fuel weight, the routine proceeds directly to step 518. After the total fuel weight and volume are sent to the remote unit 24, the routine returns to step 502.

Referring to FIG. 3, the main unit 20 includes processing means comprising a central processing unit (CPU) 100 and a signal processor 101, and a display 102 which includes the display 32. The CPU 100, the signal processor 101 and the display 102 are interconnected by a number of lines referenced generally by 103. The signal processor 101 includes inputs 104 for receiving a signal related to the temperature of the fuel being loaded from a temperature sensitive device, inputs 105 and 106 for receiving either a signal related to the density of the fuel being loaded from a densitometer on input 105 or from a turbine-type flow meter on inputs 106. The flow charts describe operation of the system with a flow meter coupled to inputs 106 to the CPU 100 of the main unit 20.

Referring to FIG. 9, which is a block diagram of the signal processor 101, the output signals 104 of the temperature probe 110 are supplied to a multiplexer 112. The temperature probe 110 is a conventional RTD (resistance-type device). The inputs 105 from the densitometer (not shown) are supplied to a densitometer signal conditioner 114 and the inputs 106 from the turbine flow meter (not shown) are supplied to an input frequency signal conditioner 116. Signal conditioners 114 and 116 (FIG. 9) provide output signals related to the signals on inputs 105,106 respectively, to gate circuitry 118 which are logic compatible with the gate circuitry. The multiplexer 112 is coupled to an analog to digital converter ("A/D") 122 which has its data outputs coupled to an address/data bus 120 via respective drivers referenced generally by 124. Information on the address/data bus 120 is coupled to a decoder 126 which has outputs coupled to the multiplexer 112 and the A/D converter 122 for controlling operation of those circuits. Information input to the decoder 126 on the address/data bus 120 is supplied from the CPU 100 on lines 103.

The address/data bus 120 is also coupled to a decoder 128 to supply information thereto from the CPU 100 for placing the system in an optional test mode (not described herein) or the operate mode, and for selecting the output of either the input frequency signal conditioner 116 or the densitometer signal conditioner 114. Gating circuitry 118 couples these signals to a programmable interval timer 130. The data outputs of the programmable interval timer 130 are coupled to the address/data bus 120 and supply information to the CPU 100 on line 103 relating to the input signals of either the densitometer or the turbine flow meter in the operate mode, or inputs relating to the optional test mode. The signal processor unit 101 also includes a decoder 132 coupled to receive signals from the CPU 100 on lines 103 and provide control signals for driver 124a coupled to the "status" output of the A/D converter 122 and to the address data line 7 of the address/data bus 120. The signal processor 101 receives from the CPU 100 other signals designated in the drawings for enabling the drivers, clocking the decoders 126,128 and controlling operation of the programmable interval timer 130. The circuit components depicted in blocks in FIG. 9 may be commercially available integrated circuits as identified and connected in FIG. 9, or their equivalents.

Referring to FIGS. 3 and 10, the CPU 100 receives signals from the keyboard 30 on lines 150 including signals relating to the aircraft, the fuel in the tanks prior to, during and at the completion of a fueling operation, the total fuel weight to be loaded and revised total fuel weights to be loaded, the specific gravity and temperature of the fuel to be loaded, and other information discussed herein and/or identified in the flow charts and the printed ticket in FIG. 2. The CPU 100 provides an output signal to the mechanical counter 47 on line 152, outputs to the LED indicators 36 through 38 on lines 154 through 156, respectively, outputs to the lamp indicators 41,42,44,45 on outputs 158 through 161, respectively, and an output to the LED indicator 35 on line 163. The LED indicators 36 through 38 and the lamp indicators 41,42,44,45 are coupled to the display unit 102 which completes the circuit for lighting the LEDs and the lamps as controlled by the state of the individual outputs from the CPU 100 to the LED and lamps. The LED indicator 35 is coupled to the coil 165 of the solenoid-controlled hydrant valve 70 which controls flow of fuel to the aircraft. The output 163 from the CPU 100 to the hydrant valve 70 couples a control signal generated by the CPU 100 for commencing and terminating fuel flow to a fuel tank. The CPU 100 is coupled to a printer (not shown) via inputs and outputs 170 and to the remote unit via inputs and outputs 172.

Referring to FIG. 10, which is a block diagram of the CPU 100, the CPU 100 includes a programmable communication interface 180 coupled to line buffers 181 and 182 for controlling transmission of data between the CPU 100 and the printer and between the CPU 100 and the remote unit 24. The CPU 100 includes an 8-bit address/data bus 183 which is coupled to the address/data bus 120 in the signal processor 101 via lines 103. The address/data bus 183 is coupled to the programmable communication interface 180 to provide parallel data to be serially output to the printer and remote unit 24 via the programmable communication interface 180 and the line buffers 181,182. Some of the data output to the printer results in printing the information shown in the ticket of FIG. 2. The CPU 100 also includes a programmable keyboard interface 186 which is coupled to receive the inputs 150 from the keyboard 30 and, via driver 188, provide the outputs to the LEDs 36 through 38 on lines 154 through 156 and the output 152 to the mechanical counter 47.

The CPU 100 includes the microprocessor 82 which has its address/data outputs coupled to the address/data bus 183 and its address outputs coupled an 8-bit address bus 190. The address/data bus 183 is coupled to a latch 192 which in turn is coupled to some of the address inputs of read only memory (ROM) 194 containing the program for the system. The address bus 190 is coupled to the remaining address inputs of the ROM 194 to provide a 13-bit address to the ROM 194. The data output of the ROM 194 is coupled to the address/data bus 183. Thus, the microprocessor 82 supplies address information for reading the program from the ROM 194 via the address/data bus 183, latch 192 and the address bus 190 which is output from the ROM 194 onto the address/data bus 183. The address bus 190 from the microprocessor 82 is also coupled to decoders 196,197, to the random access memory (RAM) 199 and to another ROM 201 which contains information required by the system to calculate fuel distribution, convert from volumetric to gravimetric units, convert to 60° F. standard gallons, correct for temperature variations, linearize the temperature probe, linearize the flow meter frequency, etc. The microprocessor 82 has a number of control outputs, and decoders 196 and 197 provide further control outputs, for controlling operation of the integrated circuits in the CPU 100 and certain integrated circuits in the signal processor 101, as described herein and indicated in the drawings.

The CPU 100 further includes a latch 203 coupled to the address/data bus 183 and a driver 205 coupled to the latch 203 for outputting the driving signals for lamp indicators 41,42,44,45 on lines 158 through 161, respectively, and the control signal on line 163 for controlling the hydrant valve 70 and its associated LED indicator 35. Also included in the CPU 100 is the programmable interval timer 80 coupled to receive information from the address/data bus 183 and other signals, and to output the control signals identified in FIG. 9. The programmable interval timer 80 provides signals on its "OUT 2" output which is coupled to the microprocessor 82 "RST 7.5" input to enable the "7.5" interrupt described above, this signal determing the incremental time during which the incremental fuel volumes and weights are determined by the microprocessor 82. From these incremental fuel volumes and weights, the microprocessor 82 determines the total volumes and weights. Signals relating to the incremental fuel volumes and weights are output from the microprocessor 82 on the address/data bus 183 and supplied on lines 103 to the display for incrementing it to show total fuel weight and volume. Total fuel weight and volume are also stored in a RAM 199 for printing and use in other computations made by the CPU 100. A real time clock 207 coupled to the address data bus 182 supplies the 62.144 KHz clock signal and a TEST FREQ signal (used in the optional test mode) to circuits in the CPU 100 and signal processor 101.

A power-up reset circuit 210 and a control signal $\overline{CS15}$ from the microprocessor 82 are coupled to the real time clock 207 via a negative input NAND gate 211 to disable the real time clock 207 during power-up when the power-up circuit 210 output is low and the control signal $\overline{CS15}$ is low. The circuit components depicted by blocks in FIG. 10 may be commercially available integrated circuits as identified and connected in FIG. 10, or their equivalents.

From the flow charts depicted in FIGS. 5 through 8, and the circuitry depicted in FIGS. 9 and 10, programs and algorithms can be constructed by those of skill in the art utilizing fuel tank information, conversion information, etc., to cause the system to carry out the functions as described herein.

Although a test mode of operation is not described, such a mode may be provided optionally for the system and entered into by pressing the TEST keypad on the main unit keyboard 30.

The ticket depicted in FIG. 2 contains information printed out upon completion of fueling. As shown, aircraft information entered into the system is printed at the top of the ticket. The fuel distribution information printed includes, by tank, in pounds, the outbound fuel requested (REQUEST) which the system determines from a total outbound fuel weight for the entire aircraft, the fuel on board at the start of the fueling operation (PRE SRV) which is entered by the operator, the fuel added (ADDED) which is determined by the system from the final fuel weight in each tank entered by the operator and the preservice fuel weight, and the final fuel weight (FINAL) for each tank which is entered by the operator when the preset quantity of fuel has been loaded. The system also prints the total fuel delivered in mass pounds (MASS-LB) and in U.S. gallons (US GAL), and indicates the difference in mass pounds (DIFFERENCE (MASS-LB)) between the added fuel obtained from totaling the added fuels for each tank and the total fuel weight computed by the system, and a weight tolerance (TOLERANCE MASS-LB) within which a printed weight difference is tolerable. Fuel temperature and density including maximums and minimums as measured by the system are printed near the bottom of the ticket. The ticket also indicates whether a preset fuel weight was cancelled by the presence or absence of "PRESET CANCELLED". Truck and operator information are printed at the bottom of the ticket.

Certain changes and modifications to the embodiments of the invention disclosed herein will be readily apparent to those skilled in the art. For example, the system may be used to load or meter many types of fuel being transferred, and the system may use circuits and devices other than those specifically disclosed herein. For example, devices other than a keyboard can be used to enter information, and many types of liquid fuel and temperature measuring devices may be used. In addition, circuitry other than that specifically shown may be used to carry out the methods described herein and the procedures defined in the flow charts. It is the applicants' intention to cover by the claims all such uses of the invention and all those changes and modifications which could be made to the embodiment of the invention herein choosen for the purpose of disclosure without departing from the spirit and scope of the invention.

What is claimed is:

1. An interactive system for determining the total quantity of liquid fuel transferred from one location to another, the system comprising a liquid volume device responsive to the flow of fuel being transferred and providing a signal relative to the volume of fuel transferred, a temperature sensitive device responsive to the temperature of the fuel being transferred and providing a signal related to the temperature of the fuel being transferred, means for entering information into the system relating to a specific gravity of the fuel to be transferred and the temperature of the fuel at which the specific gravity is measured, processing means coupled to receive the signal related to the volume of fuel being transferred, the signal related to the temperature of the fuel being transferred and the information entered by the information entering means relating to the specific gravity and temperature of the fuel for determining incremental volumes and weights of fuel being transferred during incremental time periods and the density of the fuel being transferred, the processing means including memory means for storing information related to a specific gravity of a plurality of liquid fuels at a plurality of temperatures including that of the fuel being transferred, the incremental volumes of the fuel being transferred during incremental time periods being determined by the processing means from the signal related to the volume of fuel transferred and the density of the fuel transferred during each incremental time period, the density of the fuel being transferred being determined by the processing means from the information entered relating to the specific gravity of the fuel, the signal related to the temperature of the fuel being transferred during that incremental time period and the stored information relating to specific gravity, the incremental weights of the fuel being transferred according to the incremental fuel volumes being determined by the processor means from the signals related to the incremental fuel volumes and the density of the fuel for each incremental volume, the processing means providing a signal related to the total weight of fuel transferred from the incremental fuel weight signals from which the total weight of the fuel transferred may be determined.

2. The system according to claim 1 wherein the processing means further includes means for determining the rate of flow of fuel being transferred for each incremental time period and uses the flow-rate determination in determining the incremental volume of fuel transferred therefrom.

3. The system according to claim 1 including display means for displaying at least numeric information coupled to the processing means to receive the signal related to the total weight of fuel transferred and in response thereto display the total weight of fuel transferred.

4. The system according to claim 1 wherein the processing means further provides a signal related to the total volume of fuel transferred from the incremental volume signals and including display means for displaying at least numeric information coupled to the processing means to receive the signal related to the total volume of fuel transferred and in response thereto display the total volume of fuel transferred.

5. A liquid fuel loading management system for loading fuel into at least one tank comprising the system according to claim 1 and a control device coupled to control fuel flow to the tank in response to a control signal, wherein the information entered by the information entering means includes information related to the weight of fuel in the tank at the start of a fueling operation and information related to a first total weight of fuel desired in the tank at the completion of the fueling operation, the processing means determining from the information entered relating to the fuel weights at the start and completion of the fueling operation, the weight of fuel to be loaded into the tank, and the processing means providing the control signal to the control device to cause it to terminate fuel flow when the weight of fuel loaded equals the weight of fuel to be loaded.

6. The system according to claim 1 wherein the processing means determines the density of the fuel being transferred normalized to a preselected temperature from the information entered relating to the specific gravity and temperature of the fuel being transferred and from the stored information relating to specific gravity of fuels, the processing means providing a signal related to the total volume of fuel transferred normalized to the given temperature from the signal relating to the total weight of fuel and the normalized density of fuel being transferred, the system including display means for displaying at least numeric information coupled to the processing means to receive the total fuel volume normalized signal and in response thereto display the total volume of fuel transferred normalized to the given temperature.

7. The system according to claim 6 wherein the preselected temperature is 60° F.

8. An interactive system for managing loading of liquid fuel onto an aircraft having a plurality of fuel tanks, the system comprising a liquid measuring device responsive to the flow of fuel being loaded onto the aircraft and providing a signal related to the volume of fuel loaded onto the aircraft, a control device responsive to a controlling signal for controlling fuel flow to the aircraft, means for entering information into the system including information related to the aircraft type, weight of fuel on board the aircraft at the start of a fueling operation and a first total weight of fuel desired on board the aircraft at the completion of the fueling operation, display means for displaying at least numeric information, and processing means coupled to receive said information from the information entering means and said signal from the liquid measuring device and coupled to supply information to the display means and said control signal to the control device, the processing means in response to said information related to the weight of fuel on board at the start of the fueling operation, said signal from the liquid measuring device and said information relating to the first total weight of fuel desired at the completion of the fueling operation providing the control signal to the control device to cause the control device to terminate fuel flow to the aircraft when the first total weight of fuel has been loaded, the processing means including memory means for storing information related to the capacities and locations of fuel tanks in a plurality of aircraft types, the processing means providing from the information entered by the information entering means and the information stored in the memory means signals related to the total weight of fuel to be present in each tank at the completion of the fueling operation, the processing means supplying signals related to the total weight of fuel to be present in each fuel tank to the display means which in response thereto displays the total weight of fuel to be present in each fuel tank at the completion of the fueling operation.

9. The system according to claim 8 wherein the processing means received from the information entering means further information related to a second total weight of fuel desired on board the aircraft at the completion of the fueling operation, the processing means in response to information entered into the system including the further information providing signals related to revises total weights of fuel to be present in each fuel tank at the completion of the fueling operation, the processing means supplying said signals related to revised total weights to the display means which in response thereto displays the revised total weights of fuel to be present in each fuel tank, and the processing means providing said control signal to the control device to cause it to terminate fuel flow when the second total weight of fuel has been loaded onto the aircraft.

10. The system according to claim 9 wherein the means for entering information comprises a keyboard for entering information related to the aircraft type, weight of fuel on board the aircraft at the start of a fueling operation and the first and second total weights of fuel, and a manually activated switch for conditioning the processing means to receive the information related to the second total weight of fuel.

11. The system according to claim 9 wherein said information entering means includes a means for entering information relating to the density of the fuel to be loaded into the aircraft, said system including means for transferring said density information to the processing means, the system further including a temperature sensitive device responsive to the temperature of the fuel being loaded on the aircraft and providing a signal related to the temperature of the fuel being loaded, the processing means receiving the temperature device signal, the memory means storing information related to the densities of fuels at a plurality of temperatures, the processing means from the density information entered, the density information stored, the temperature device signal and the revised total fuel weight signals further revising the revised total fuel weight signals in accordance with changes in the density of the fuel being loaded.

12. An interactive system for determining the total volume of liquid fuel transferred from one location to another normalized to a preselected temperature, the system comprising a liquid volume measuring device responsive to the flow of fuel being transferred and providing a signal related to the volume of fuel transferred, a temperature sensitive device responsive to the temperature of the fuel being transferred and providing a signal related to the temperature of the fuel being transferred, means for entering information into the system relating to a specific gravity of the fuel to be transferred and the temperature of the fuel at which the specific gravity is measured, processing means responsive to the signal related to the volume of fuel being transferred, the signal related to the temperature of the fuel being transferred and the information entered relating to the specific gravity and temperature of the fuel, the processing means including memory means storing information related to the specific gravity of a plurality of liquid fuels including that of the fuel being transferred at a plurality of temperatures, the processing means providing a first signal related to the total weight of the fuel transferred corrected for temperature variations during transfer from the signal related to the volume of fuel being transferred, the signal related to the temperature of the fuel being transferred and a density of the fuel being transferred, the processing means providing a second signal related to the density of the fuel being transferred normalized to the preselected temperature from the information entered relating to the specific gravity and temperature of the fuel being transferred and from the stored information relating to the specific gravity of fuels, the processing means providing a third signal related to the total volume of fuel transferred normalized to the preselected temperature from the first and second signals.

13. The system according to claim 12 including display means coupled to the processing means to receive the third signal and display the total volume of fuel transferred normalized to the given temperature.

14. A method of normalizing a volume of fuel transferred from one location to another to a temperature normalized volume comprising the steps of:
   determining the rate of flow of fuel;
   integrating the rate of fuel flow during incremental time periods to obtain incremental volumes of fuel flow;
   computing the density of the fuel which flowed for each incremental volume of fuel flow;
   computing the weight of each incremental volume of fuel transferred from the incremental volumes and the densities corresponding to the incremental volumes;
   summing the weights of the incremental weights of fuel loaded to obtain the total weight of fuel transferred;
   normalizing the density of the fuel transferred to a preselected temperature; and
   obtaining the normalized volume from the total weight and the normalized density.

* * * * *